United States Patent [19]

Dobson et al.

[11] Patent Number: 4,501,985
[45] Date of Patent: Feb. 26, 1985

[54] DYNAMOELECTRIC MACHINE WITH END TURN SUPPORT ASSEMBLY HAVING FASTENERS WITH LOCKING DEVICES

[75] Inventors: Diane P. Dobson, Pleasant Hills; Michael J. Farrell, Swissvale, both of Pa.; Raymond S. Lutz, Louisville, Ky.

[73] Assignee: Westinghouse Electric Corp., Pittsburgh, Pa.

[21] Appl. No.: 605,957

[22] Filed: May 1, 1984

[51] Int. Cl.³ .............................................. H02K 3/46
[52] U.S. Cl. ..................................... 310/270; 310/260
[58] Field of Search ................... 310/42, 45, 216–218, 310/260, 270; 336/197

[56] References Cited

U.S. PATENT DOCUMENTS

| | | | |
|---|---|---|---|
| 3,089,048 | 5/1963 | Bahn et al. | 310/270 X |
| 4,379,243 | 4/1983 | Dailey et al. | 310/260 |
| 4,415,825 | 11/1983 | Dailey et al. | 310/270 |

FOREIGN PATENT DOCUMENTS 496303 11/1919 France ................................ 310/270

Primary Examiner—Mark O. Budd
Attorney, Agent, or Firm—G. H. Telfer

[57] ABSTRACT

A locking device on the end of a threaded fastener in an end winding support assembly is provided by a wrapped and tied cord on the stud end outside the nut with a coating of resinous material over the cord and a flat surface area on the stud to prevent turning of the assembled cord.

5 Claims, 3 Drawing Figures

DYNAMOELECTRIC MACHINE WITH END TURN SUPPORT ASSEMBLY HAVING FASTENERS WITH LOCKING DEVICES

BACKGROUND AND SUMMARY OF THE INVENTION

This invention relates to dynamoelectric machines, such as large turbine generators, whose end turns are supported in an assembly that includes threaded fasteners.

For general background, reference is made to Dailey et al. U.S. Pat. Nos. 4,379,243, Apr. 5, 1983 and 4,415,825, Nov. 15, 1983, and pending application Ser. No. 595,025, filed by Dailey et al. March 30, 1984 and assigned to the present assignee, whose descriptions are representative of the use of threaded fasteners in the end winding assemblies of dynamoelectric machines. As such designs have developed, they involve numerous fasteners including threaded studs and nuts for such purposes as anchoring top and bottom coils to a support cone, mounting a parallel ring structure to the end winding, and attaching radial bracing for the support cone.

The use of such fasteners presents two kinds of potential problems. One is that the nut may, after initial tightening, become loose as materials of the joined structure age and have been subjected to the forces encountered in machine operation. Without frequent retightening this may shorten the life of the components intended to be secured. Therefore, a desirable fastener should prevent loss of bolt load through loss of torque on the nut or reduce this loss to a sufficiently slow rate to allow retorquing of the hardware at reasonable service intervals.

Secondly, it is possible that a loose nut will not only fail to hold the assembly as desired, but that it will become a loose object in the machine that can lead to other types of wear and ultimate failure.

U.S. Pat. No. 4,379,243 (FIG. 8) shows a U-shaped retainer over the nut. Cords looped through holes in an adjacent component and over parts of the retainer hold it in place. This device keeps the nut from coming entirely off the stud but has minimal effectiveness against loosening of the nut.

In U.S. Pat. No. 4,415,825, it is disclosed that a nut on a stud end may have a pin inserted through a hole in it into one or more other elements of the joined structure. This secures the nut but further complicates the assembly through the need of forming and aligning the holes for the pin and ensuring the pin stays in place. Such a pin is not readily removed for retightening the nut. Also, that patent shows an example of a nut being retained on a stud through the use of a hardenable fabric such as a thermosetting tape that is wrapped around the nut and stud end after the nut is initially secured in place. This has not been found very successful in locking the nut but it does provide assurance against the nut becoming a loose missile in the machine.

A nut lock, which is not disclosed as applied in a dynamoelectric machine end winding assembly and would not be suitable for such purposes, is disclosed in Graffius U.S. Pat. No. 778,030, Dec. 20, 1904. The nut lock is a soft metal wire coil wound on the threads of a bolt against a nut. While such a device may slow the loosening of an adjacent nut, it is of limited value as the coil can be unscrew in a manner similar to that of a second nut.

The foregoing are representative of the varied attempts over a long period of time to provide a reliable, easy to use, locking device for nuts on threaded bolts or studs, particularly for nuts on fasteners in end winding assemblies of dynamoelectric machines.

Therefore, it is desirable to provide dynamoelectric machine end turn winding support assemblies with fasteners having locking devices that are easy to implement and which provide both assurance against loosening of the nut as well as the possibility of the nut becoming totally separated from the stud.

It is further desirable that the locking device employed on the fasteners be both easy to apply and to remove so service in the field can be performed to retighten the structure because materials have shrunk.

In accordance with the present invention, an end turn support assembly of a dynamoelectric machine is provided that includes fasteners holding the elements thereof together that have a stud with screw threads, a nut engaged on the stud screw threads, an outer portion of the stud extending beyond the nut, and a locking device on the outer portion of the stud for securing the nut against loosening in service, with the locking device comprising one or more layers of cord wrapped and tied on the stud outer portion screw threads and a cured coating of resinous material on the layers of cord. The stud outer portion preferably has a flat surface area, without threads, underlying the cord. The cord conforms to the uncylindrical configuration of that part of the stud to prevent the cord from turning on the stud like a nut. Also the stud outer portion preferaly has a layer of lubricant material on it underlying the cord to permit easy removal of the cord, and hence the nut, when desired simply by severing the cord and pulling it off. Washers, such as Belleville type spring washers, may also be used on the stud. All parts of the fastener assembly are preferably nonmagnetic and nonconducting.

DESCRIPTION OF THE PREFERRED EMBODIMENTS

Figure 1:
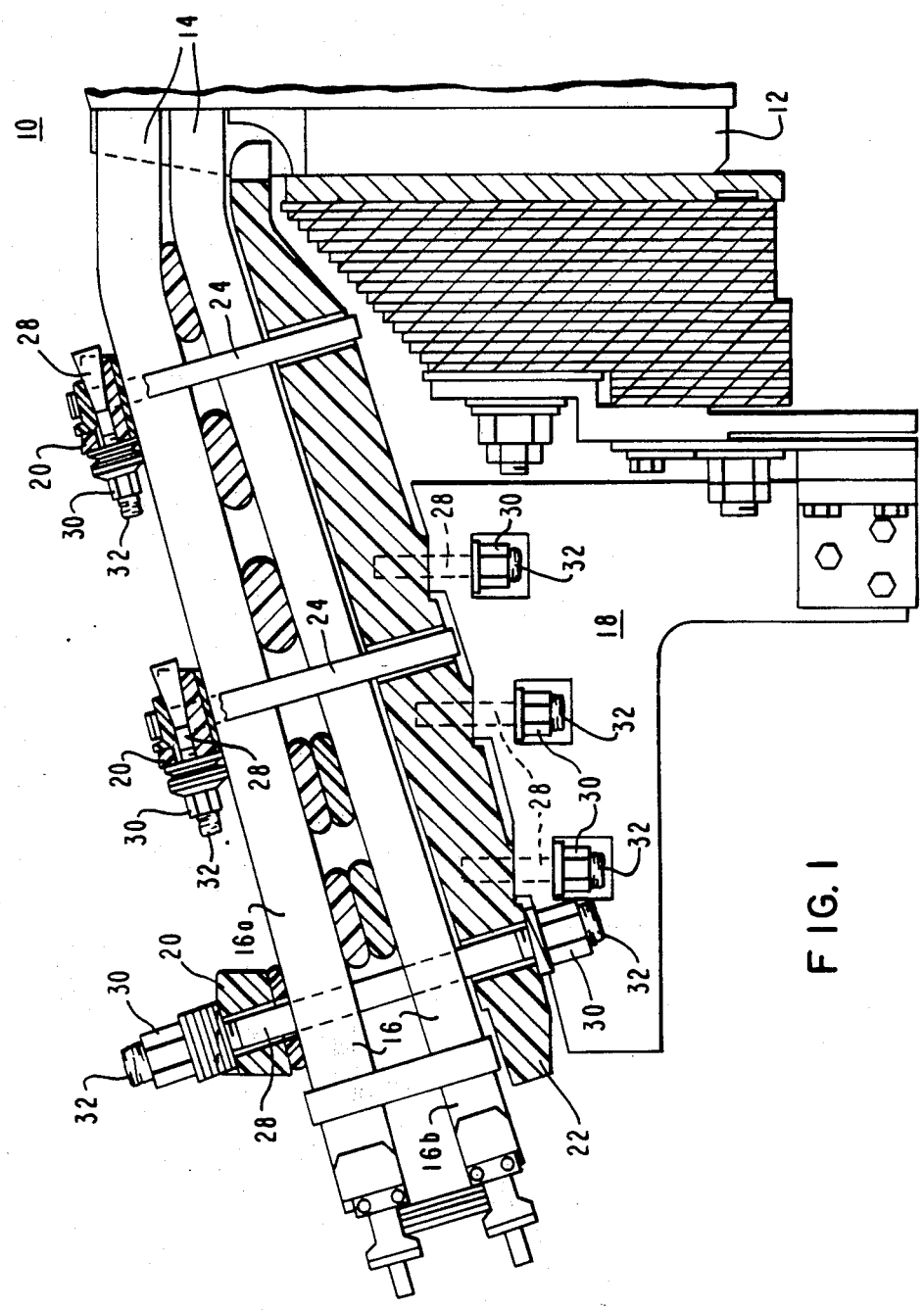
FIG. 1 is a view, partly in section, of a dynamoelectric machine end winding support structure with fasteners having locking devices in accordance with the present invention.

Referring to FIG. 1, a dynamoelectric machine is shown with a stator 10 having a stator core 12 and stator windings 14 that have end turns 16 extending from the ends of the core. An end turn support assembly 18 is provided for the end turns 16 and may include numerous elements such as are more fully described in the above-mentioned patents and particularly the above-mentioned pending application. In this representative illustration, such elements include, among others, support rings 20 on the inside of top coils 16a of the end turns 16, a support cone 22 outside of bottom coils 16b, banding 24 securing some of the rings 20 to the cone 22, and braces 26 outside the cone 22. Fasteners with threaded studs 28 and nuts 30 are used in various places in the assembly: to secure the banding 24 to secure the cone 22 and outer ring 20, and to secure the brace 26 to the cone 22. These are representative of the use of threaded fasteners in an end winding support assembly of a large turbine-generator. Typically, about 250 fasteners might be used at each end of the machine.

Figure 3:
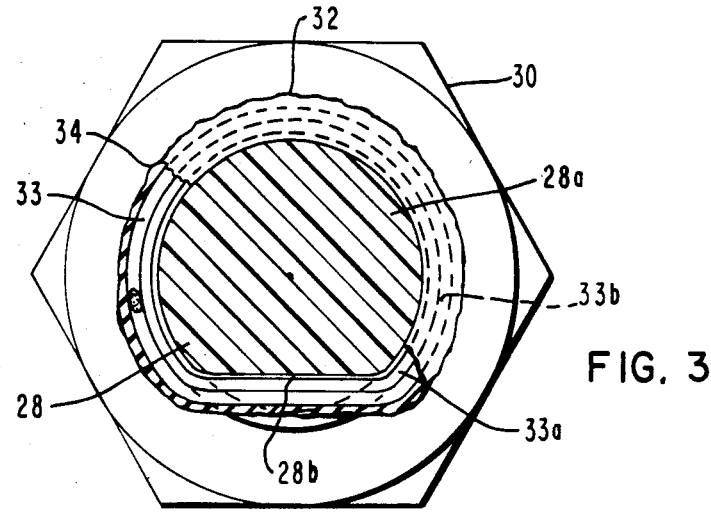
FIGS. 2 and 3 are, respectively, a sectional view of a fastener in accordance with an embodiment of the present invention.
Figure 2:
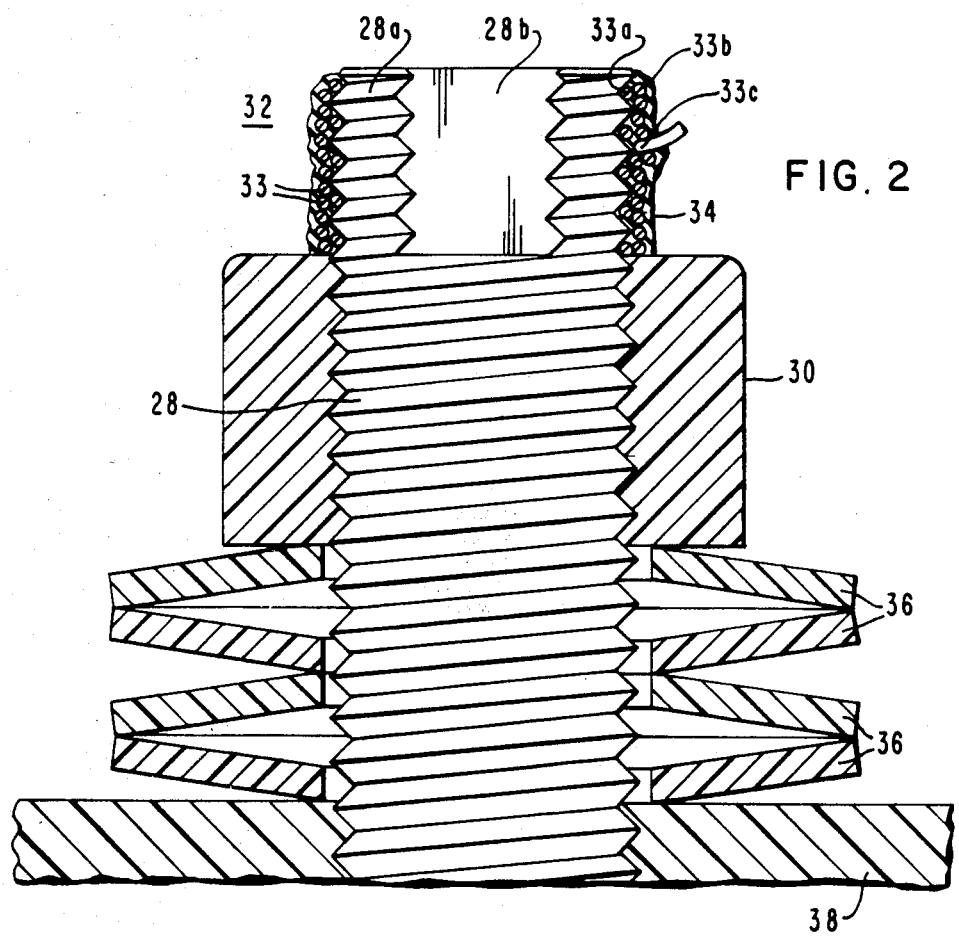

In acccordance with this invention, and with reference to FIGS. 2 and 3 as well as FIG. 1, each of the studs 28 has an outer portion 28a extending beyond the nut 30 with a locking device 32 on that outer portion stud for securing the nut against loosening in service. In some cases, as shown in the left part of FIG. 1, a nut 30 and a locking device 32 is located at each end of a stud 28. However, in other regions of the end turn assembly, the threaded stud 28 may screw into one of the support elements (such as cone 22) or be otherwise secured and a nut and locking device is only required on one end of the stud.

The locking device 32 comprises cord 33 in one or more (preferably two) layers 33a and 33b wrapped and tied on the stud outer portion 28a scew threads and a cured coating 34 of resinous material on the layers of cord for preventing the cord from being dislodged.

As shown in FIGS. 2 and 3, the stud outer portion 28a has a flat surface area 28b over which the cord 33 is wrapped. The flat surface area 28b provides a structure to which the wrapped cord conforms so that the completed locking device 32 is not susceptible to turning on the stud like a nut. Area 28b may be formed with a file or may be otherwise machined on stud portion 28a. More complex geometries than that shown could be used for additional security but have not been found necessary.

The stud outer portion 28a also has a layer of lubricant material (not shown) thereon underlying the cord 33 to permit easy removal of the cord, when desired, and hence the nut 30, by simply severing and pulling off the cord. FIG. 2 also shows washers 36 used to maintain force on the nut 30 and a held element 38.

The locking device has the following characteristics:

It is of all non-metallic, non-magnetic, nonconducting, good dielectric material. For example, glass fiber reinforced epoxy resin materials are used for the stud and nut (and washers or other spacers, if used) and the tying cord 33 is of a glass fiber-polyester fiber composite.

The locking device 32, when subjected to 120 Hz vibration as encountered in service, does not permit the nut to become a loose object nor allow loss of torque more rapid than can be retightened on a reasonable maintenance schedule.

The locking device 32, as well as the rest of the fastener, are not affected by hydrogen, humidity, 80° C. temperatures, turbine oil, cleaning solvents such as 1-1-1 trichloroethylene, or other environmental factors in a generator.

The locking device 32 does not damage the nut 30 or the threads on the stud 28 so that removal of the nut and retightening of the nut are easily performed even in the field.

The locking device 32 does not interfere with the action of disc-shaped spring washers (Belleville washers) 36.

To apply the locking device 32, in accordance with a specific procedure, by way of example, the following is done. It is merely required that a short length 28a, such as about 0.38 inch minimum, of stud 28 protrude beyond the nut 30 in order to apply the cord 33. Paraffin wax, or some other lubricant, is applied to the stud portion 28a as a lubricant and release agent prior to the application of the cord. A length of dacron polyesterglass cord 33, such as about 30 to 36 inches in length, is used. One end of the cord is held on the flat 28b so that it touches the nut. With the other hand, the cord 33 is wrapped in the threads at the end of the flat area 28b of the stud 28 and then wrapped inward toward the nut 30. The cord diameter is roughly equal to or slightly less than the pitch of the screw threads. When the cord 33 reaches the nut 30, one complete wrap of the cord is made directly adjacent to the nut. Then the wrapping proceeds from the nut 30 back to the end of the stud 28, forming a second wrapping 33b overlapping the first layer 33a until the end of the flat portion 28b is reached. The cord 33 is pulled tight and held firmly to the stud 28 and then a half hitch knot 33c is made and pulled until it is firmly secured in the middle of the wrappings. Any excess cord 33 is then cut away with scissors. To seal the locking device 32, a room temperature curing epoxy resin 34 is applied with a paintbrush to all of the locking device cord 33. This procedure is repeated for all locking assemblies. It is thus seen that through multiple layers of cord and the use of the lubricant on the stud end that the layer of curing resin does not penetrate to an extent to bond the cord to the stud. The coating 34 essentially only covers cord outer layer 33b.

Tests on hardware assemblies in accordance with the present invention and like fasteners but without a locking device 32 as herein disclosed were conducted. The results are shown in the following table and confirm that the locking device 32 greatly strengthens the assembly and thereby reduces the likelihood of it becoming disassembled or undesirably loosened during the operation of the machine.

TABLE

| TORQUE NECESSARY TO BACK-OFF NUT FROM HARDWARE ASSEMBLY | |
|---|---|
| Sample | Torque to Back Off Nut |
| Nut torqued on with 65 ft-lbs. No locking device applied | 50 ft-lbs. |
| Nut torqued on with 65 ft-lbs. No locking device applied Cycled $10^4$ cycles 0–7000 lbs. | 50 ft-lbs. |
| Nut torqued on with 65 ft-lbs. Locking device applied. | Stud broke at 120 ft-lbs. |
| Nut torqued on with 65 ft-lbs. Locking device applied. Cycled $10^4$ cycles 0–7000 lbs. | 110 ft-lbs. |

The locking device may be removed by using a knife or file to cut through the half hitch knot 33c and then prying up the strands of cord with a narrow blade screwdriver. The ends of the severed cord are grasped and pulled free with pliers or other suitable tool. The stud is then wiped clean with a clean, dry cloth. The hardware assembly is then ready to be disassembled.

It is therefore seen that the present invention provides increased reliability of the end winding support assembly by a device that is easy to apply and remove. The foregoing description is representative of the embodiments of the invention as presently preferred although the invention may be practiced in other specific forms consistent with the general principles herein.

I claim:

1. A dynamoelectric machine comprising:
windings that have end turns extending from ends of a core and an end turn support assembly for said end turns;

said end turn support assembly comprising means for uniting said end turns and comprising one or more fasteners that each join some other elements of said end turn support assembly;

each of said fasteners comprising a stud having scew threads, a nut engaged on said stud screw threads, an outer portion of said stud extending beyond said nut, and a locking device on said outer portion of said stud for securing said nut against loosening in service;

said locking device comprising one or more layers of cord wrapped and tied on said stud outer portion screw threads and a cured coating of resinous material on said layers of cord, said stud outer portion having a flat surface area providing a noncylindrical stud cross section to which said wrapped cord conforms and preventing rotation of said cord.

2. A dynamoelectric machine in accordance with claim 1 wherein: said stud outer portion has a layer of a lubricant material thereon underlying said cord to permit easy removal of said cord and, hence, said nut, when desired, by severing of said cord.

3. A dynamoelectric machine in accordance with claim 2 wherein: said stud, said nut, said cord, said coating, and said lubricant are all of materials that are non-metallic, non-magnetic and non-conductive.

4. A dynamoelectric machine in accordance with claim 3 wherein: said stud and said nut are of glass fiber reinforced epoxy resin, said cord is of glass and polyester fibers, said coating is of epoxy resin, and said lubricant is of paraffin.

5. A dynamoelectric machine in accordance with claim 1 wherein: said means for uniting said end turns includes support rings within top coils of said end turns, a support cone outside of bottom coils of said end turns, braces outside of said support cone, and radial banding around top and bottom coils and said cone; and said fasteners with said locking devices thereon join said braces to said support cone, join said support cone to one or more of said support rings, ad tighten said radial banding.

* * * * *